United States Patent
Zhu

(10) Patent No.: US 8,763,086 B2
(45) Date of Patent: *Jun. 24, 2014

(54) SERVICE SHARING AMONG IMS USERS

(75) Inventor: Zhongwen Zhu, Saint-Laurent (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1075 days.

This patent is subject to a terminal disclaimer.

(21) Appl. No.: 12/201,933

(22) Filed: Aug. 29, 2008

(65) Prior Publication Data

US 2010/0058445 A1   Mar. 4, 2010

(51) Int. Cl.
 G06F 7/04    (2006.01)
 G06F 15/16   (2006.01)
 G06F 17/30   (2006.01)
 H04L 29/06   (2006.01)

(52) U.S. Cl.
 USPC ........ 726/4; 726/2; 726/3; 709/205; 709/227; 709/229

(58) Field of Classification Search
 USPC .............. 726/2, 3, 4, 16, 17, 19, 20; 709/205, 709/227, 228, 230, 232
 See application file for complete search history.

(56) References Cited

U.S. PATENT DOCUMENTS

| | | | |
|---|---|---|---|
| 8,285,983 B2* | 10/2012 | Hallenstal et al. | 713/151 |
| 8,326,942 B2* | 12/2012 | Cagenius | 709/217 |
| 2003/0108000 A1* | 6/2003 | Chaney et al. | 370/260 |
| 2004/0210770 A1 | 10/2004 | Sanin et al. | |
| 2007/0083605 A1 | 4/2007 | Satzke et al. | |
| 2007/0149174 A1 | 6/2007 | Torvinen | |
| 2008/0084867 A1* | 4/2008 | Foti et al. | 370/352 |
| 2008/0090598 A1* | 4/2008 | Fanelli et al. | 455/466 |
| 2008/0127255 A1* | 5/2008 | Ress et al. | 725/38 |
| 2008/0267170 A1* | 10/2008 | Allen et al. | 370/352 |
| 2008/0310637 A1* | 12/2008 | Li et al. | 380/278 |
| 2009/0019156 A1* | 1/2009 | Mo et al. | 709/225 |
| 2009/0077181 A1* | 3/2009 | Chen | 709/206 |
| 2009/0235299 A1* | 9/2009 | Astrom et al. | 725/25 |
| 2011/0010459 A1* | 1/2011 | Stokking et al. | 709/231 |

FOREIGN PATENT DOCUMENTS

| | | |
|---|---|---|
| FR | 2 910 759 A1 | 6/2008 |
| WO | 2006/125474 A1 | 11/2006 |
| WO | 2007/021223 A1 | 2/2007 |
| WO | 2007/070652 A1 | 6/2007 |
| WO | 2007/116258 A1 | 10/2007 |

OTHER PUBLICATIONS

International Search Report for PCT/IB2009/053648 dated Nov. 5, 2009, 13 pages.

* cited by examiner

Primary Examiner — Tae Kim

(74) Attorney, Agent, or Firm — Ericsson Canada Inc.; Alex Nicolaescu

(57) ABSTRACT

Systems, methods, devices and software according to these exemplary embodiments provide techniques for sharing services among IMS users. An unsubscribed service, e.g., provided by another operator, can be accessed upon request and verification of authorization with an existing subscriber of that service.

24 Claims, 9 Drawing Sheets

SERVICE SHARING AMONG IMS USERS

TECHNICAL FIELD

The present invention relates generally to telecommunications systems and improving service therein.

BACKGROUND

As the level of technology increases, the options for communications have become more varied. For example, in the last 30 years in the telecommunications industry, personal communications have evolved from a home having a single rotary dial telephone, to a home having multiple telephone, cable and/or fiber optic lines that accommodate both voice and data. Additionally, cellular phones and Wi-Fi have added a mobile element to communications.

To accommodate the new and different ways in which IP networks are being used to provide various services, new network architectures are being developed and standardized. IP Multimedia Subsystem (IMS) is an architectural framework utilized for delivering IP multimedia services to an end user. The IMS architecture has evolved into a service-independent topology which uses IP protocols, e.g., Session Initiation Protocol (SIP) signaling, to provide a convergence mechanism for disparate systems. In part this is accomplished via the provision of a horizontal control layer which isolates the access network from the service layer. Among other things, IMS architectures may provide a useful platform for the rollout of IPTV systems and services.

According to the 3GPP standards organization, multimedia services deployed in IMS networks can be used by IMS users who subscribe to that network. For example, a public service identity (PSI), i.e., one type of SIP uniform resource identifier (URI), enables an IMS user to locate a service within its own IMS network. The PSI is either pre-configured at the terminal, or downloaded from the provisioning node in the IMS network.

Presence information is also available in IMS networks to enable IMS users to know when, for example, their friends are online in their IMS network or in other IMS networks. Such presence information can, for example, be exchanged between two users via the SUBSCRIBE/PUBLISH/NOTIFY mechanism specified by the Open Mobile Alliance (OMA). This presence information includes, among other things, the service capability (SC) at the user's terminal or equipment (UE), e.g., including information about the UE's short message service (SMS) messaging handler, multimedia message service (MMS) messaging handler, instant message (IM) group messaging handler (one-to-many) and IM multi-chat handler. For example, as shown generally in FIG. 1, a first user or user equipment 10 can share information about its service capabilities (SC1-SC3) with a second user or user equipment 12 using presence signaling through its own IMS network 14 and the second user's IMS network 16.

However, this presence information is terminal related only; it provides no network service indication. For instance, suppose that the UE 10 has MMS capability but there is no multimedia message service center (MMSC) in that user's operator's network 14. In this case, the other user 12 will be aware that the UE 10 has MMS capability, but will have no idea whether that user's IMS network operator provides MMS service.

SUMMARY

Systems, methods, devices and software according to these exemplary embodiments provide techniques for sharing services among IMS users. An unsubscribed service, e.g., provided by the same or another operator, can be accessed upon request and verification of authorization with an existing subscriber of that service.

According to one exemplary embodiment a method for providing a service to an unsubscribed user includes the steps of receiving a service request for a service from an unsubscribed user equipment, extracting, from the service request, an identity of a subscribed user equipment of the service, sending an authorization request toward the subscribed user equipment, receiving an authorization message from the subscribed user equipment, and authorizing provision of the service to the unsubscribed user equipment.

According to another exemplary embodiment, a communications node includes an interface for receiving a service request for a service, a memory device for storing information associated with said service request, and a processor configured to extract, from the service request, an identity of a subscribed user equipment of the service, and to send an authorization request toward the subscribed user equipment, wherein after the interface receives an authorization message from the subscribed user equipment, the processor authorizes provision of the service to the unsubscribed user equipment.

According to still another exemplary embodiment, a method for accessing an unsubscribed service from a user equipment including the steps of selecting an unsubscribed service, and transmitting a service request for the unsubscribed service toward a server, wherein the service request includes an identity of a subscriber of the unsubscribed service.

According to another exemplary embodiment, a user equipment includes a user interface for selecting an unsubscribed service, and a processor configured to transmit a service request for the unsubscribed service toward a server, wherein the service request includes an identity of a subscriber of the unsubscribed service.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Figure 1:
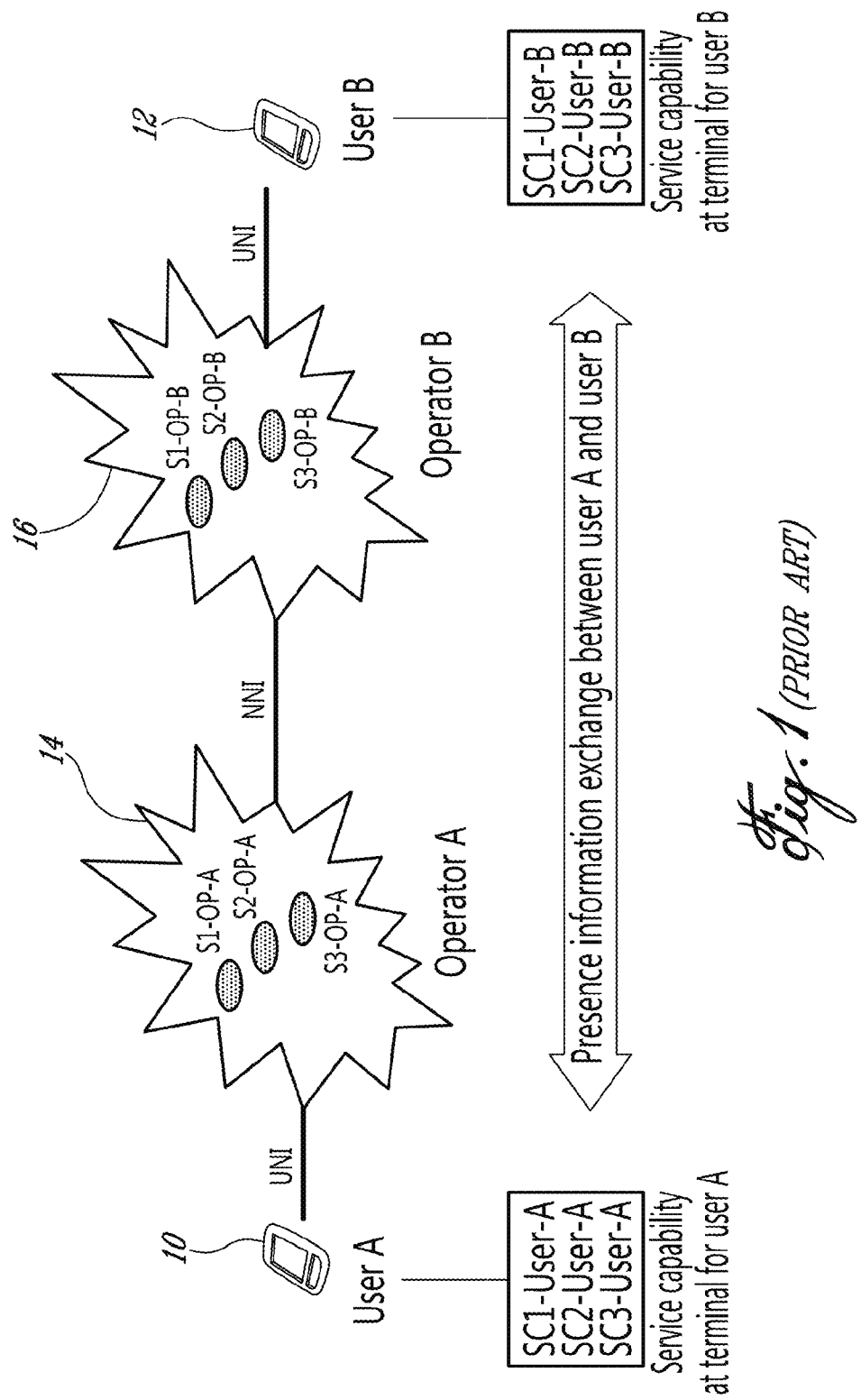
FIG. 1 illustrates a conventional exchange of terminal capabilities.
Figure 2:
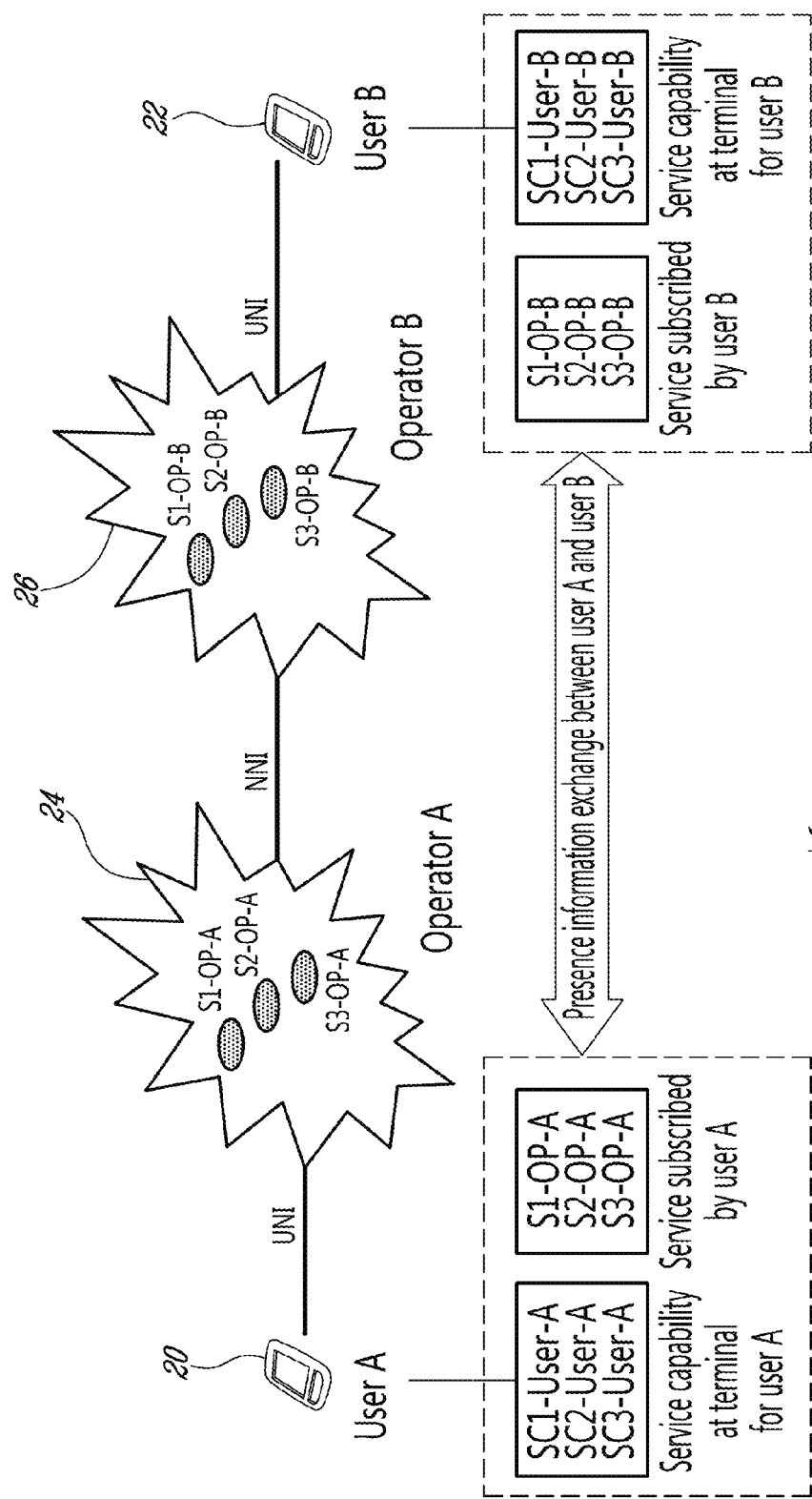
FIG. 2 illustrates an exchange of both terminal capabilities and service capabilities between user equipment associated with different operator domains according to exemplary embodiments.

As mentioned above, IMS systems currently do not provide any mechanism for subscribers from one IMS network to identify or access services provided to subscribers in another IMS network. However, for various reasons, e.g., to enable subscribers to preview a new multimedia service which has been deployed in one IMS network prior to implementing that same service in another network, it may be desirable according to exemplary embodiments to inform subscribers of services in other IMS networks and/or to allow users to access services provided in other IMS networks. Additionally, it may be useful to enable a user in a network to try or preview a service which is available in his or her network but to which he or she has not yet subscribed. Consider, for example, the communication system according to an exemplary embodiment illustrated in FIG. 2.

Therein, a first user A's terminal or UE 20 provides information regarding both its terminal capabilities (SC1, SC2, SC3, etc.) and its subscribed services (S1-OP-A, S2-OP-A, S3-OP-A, etc.) to a second user B's terminal or UE 22. This information can be provided to, for example, friends or buddies of one user by publishing service-IDs, such as S1-OP-A shown in FIG. 2, along with a user's other presence information in the network. For example, using the SUBSCRIBE/PUBLISH/NOTIFY mechanism (described in more detail below), the service-ID for the service(s) deployed in the network 24 associated with operator A can be received by another user 22 who is a subscriber in the network 26 run by operator B. According to one exemplary embodiment, when the user 22 in the other operator's domain (i.e., operator B in the example of FIG. 2) wants to use a service offered by operator A, a subscriber 20 who subscribes to the desired service in the network 24 associated with operator A is contacted for authorization to permit the user 22 to access this service. Once that authorization is received, the user 22 in network 26 associated with operator B is able to access and use the service provided by operator A. Various exemplary embodiments associated with providing the capability for service sharing among IMS users across different operator domains (also referred to herein as "foreign services"), e.g., at different levels including foreign service publication, user interface for selection of foreign services, and foreign service requests, will now be described. However it will be appreciated, and is described in more detail below, that service sharing according to these exemplary embodiments may also be performed within a single network or operator domain.

Figure 3:
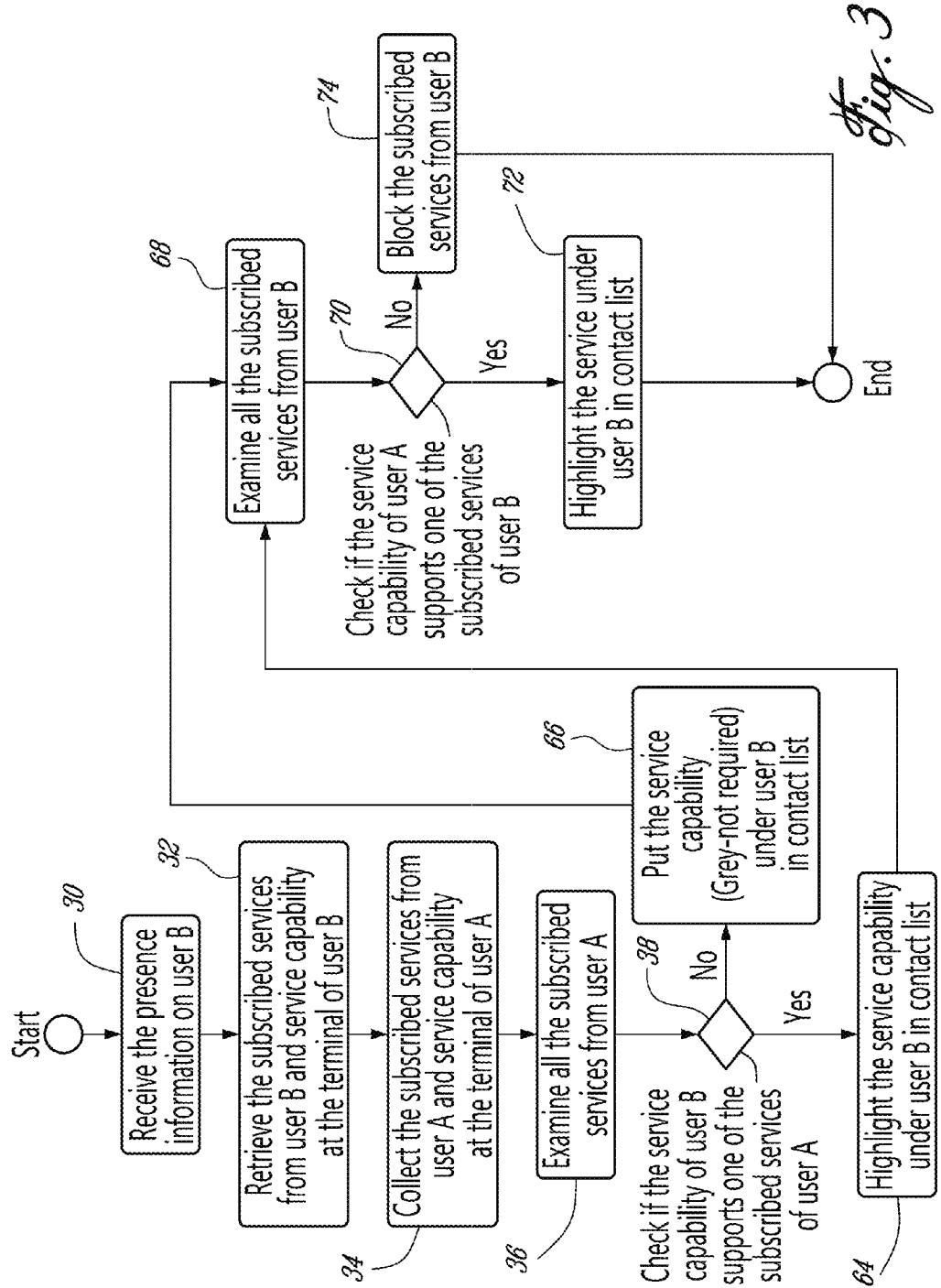
FIG. 3 is a flowchart illustrating a method for receiving and displaying terminal capabilities and service capabilities according to exemplary embodiments.

The flow diagram shown in FIG. 3 illustrates how, according to one exemplary embodiment, the services and service capabilities associated with one remote user (e.g., user B 22) are retrieved from the received presence information of that remote user 22. Starting with step 30, user A and/or UE 20 (hereafter referred to jointly and individually as "UE 20") receives the presence information associated with user B and/or UE 22 ("hereafter referred to jointly and individually as UE 22") using the SUBSCRIBE/PUBLISH/NOTIFY mechanism. For example, the UE 22 can perform a presence procedure (not shown in FIG. 3), to publish the identities of the services to which it has subscribed, along with the other presence information specified in this standard. The presence procedure can, for example, be performed, e.g., as specified by standards promulgated by the Open Mobile Alliance (OMA), albeit with the new addition of network service information. More specifically, the XML format of the OMA presence message can be modified to include, for example, the following information for each service to which UE 22 has subscribed: service identity, required service capability, service address and service icon. For more information regarding the SUBSCRIBE/PUBLISH/NOTIFY mechanism generally, the interested reader is directed to the published 3GPP standards specification 3GPP TS 24.141 V8.1.0 (2008-06), the disclosure of which is incorporated here by reference.

Returning to FIG. 3, UE 20 retrieves (step 32) the services that UE 22 has subscribed to from its operator/network 26, which services might be different from those offered by the operator/network 24 of UE 20. UE 20 collects its own service capabilities, e.g., identifiers associated with may be stored in memory, and also retrieves the services that it has subscribed to from its operator/network 24 at step 34. At this point the UE 20 can, for example, examine and display the various capabilities and services of which it has become aware at step 36, using, e.g., the user interface 50 illustrated in FIG. 4.

Therein, a "Contacts" user interface 50 is illustrated, which user interface can be displayed on, e.g., a liquid crystal or other type of illuminated display on UE 20. It will be appreciated that the user interface 50 is in all respects exemplary and that various mechanisms could alternatively be provided by way of which a user could be provided with information regarding foreign service options according to these exemplary embodiments. However, according to this exemplary embodiment, it will be noted that the services offered by the operator/network 24 to which UE 20 is subscribed are displayed in a row 52 at the bottom of the user interface 50. In this purely illustrative example, there are two icons depicted in row 52, e.g., one icon 54 associated with a chat service to which the UE 20 has subscribed and another icon 56 associated with a location-based service to which the UE 20 has subscribed.

Figure 4:
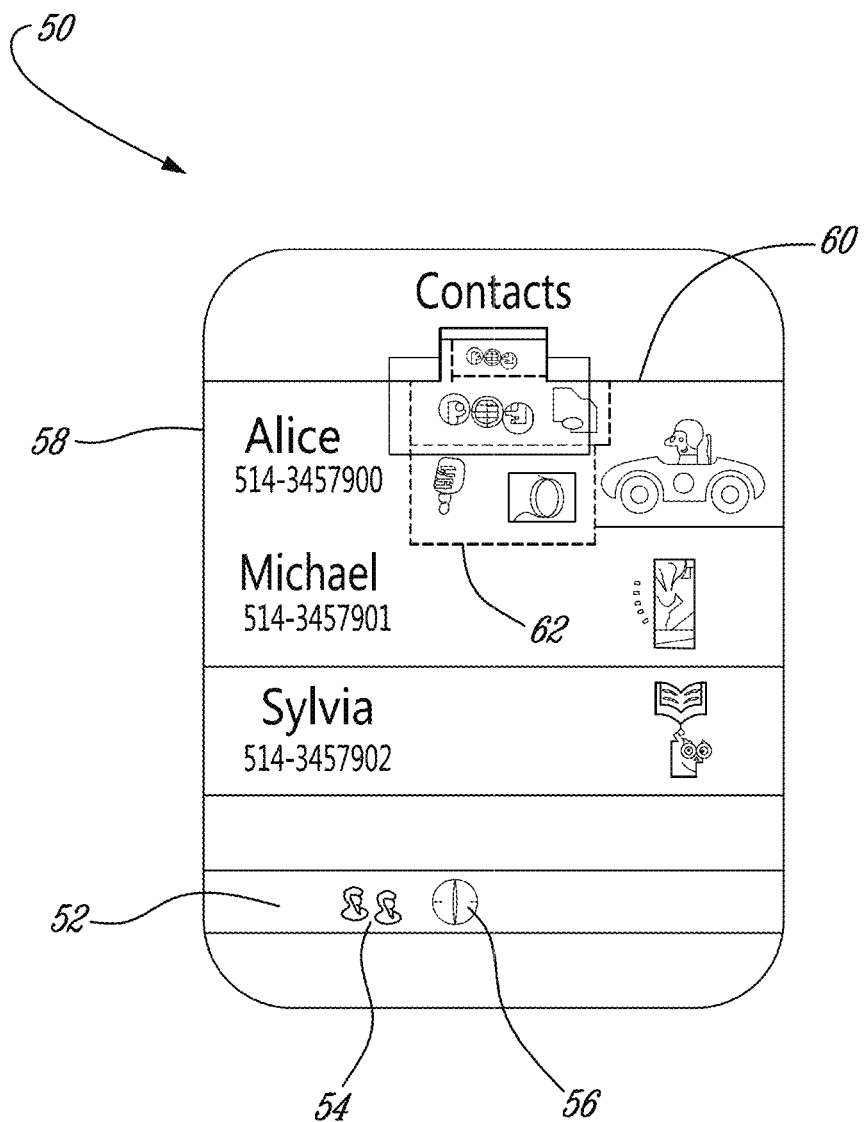
FIG. 4 shows a user interface according to exemplary embodiments.

Additionally, each user associated with, e.g., a friend or buddy of, UE 20, may have his or her own, displayed, row of contact information in the user interface 50. Among other things, each friend's row of contact information can include, for example, services associated with their UE (e.g., those which are offered by their network and/or to which they have subscribed) and service capabilities associated with their UE. Those services which are subscribed to by, e.g., a friend or buddy, but not subscribed to by the UE 20 are referred to herein as "unsubscribed" services. In this example, for UE 20's friend "Alice", a row 58 of information is provided on the user interface 50. The user interface provides a first group of icons 60 which indicate to the user of UE 20 the unsubscribed services which are available via Alice, e.g., a conference service and a file transfer service. A second group of icons 62, which in this example are located below the first group of icons, represent the service capabilities which are provided by Alice's terminal, e.g., voice and video capabilities. The other icons seen in FIG. 4 represent the users themselves. For instance, suppose that Alice takes a picture of herself at the airport and she wants her contacts to see that picture with her presence information. The pictures or icons which represent the individual users can be changed from time to time.

In addition to simply displaying the unsubscribed and/or foreign services which are available from other users, networks and/or operators and the service capabilities of friends' terminal devices, the UE 20 and/or interface 50 can provide additional information regarding the potential synergies between UE 20's services and service capabilities and those of other UEs according to exemplary embodiments. For example, if the service capabilities of UE 22 (user B) support a service associated with UE 20 (user A), then this service capability can be highlighted or otherwise emphasized in the user interface 50, e.g., the corresponding icon in row 52 can be highlighted. This evaluation and display step can be seen in, returning to FIG. 3, step 64 which follows the "Yes" path from decision block 38. As another example, if the service capability of UE 22 does not support one of the services available via UE 20, that service capability can be 'greyed-out' or otherwise de-emphasized in the user interface to indicate that such a service capability need not be considered by the user of UE 20 (step 66), e.g., if UE 20 has not subscribed to a video service, then the video service capability icon in group 62 could be greyed-out.

At step 68, the services offered by the network/operator 26 of UE 22 (user B) are examined by, e.g., the UE 20. If the service capabilities at UE 20 support one of the services offered by the network/operator (or subscribed to by UE 22), then that service can be highlighted or otherwise emphasized in the row of interface 50 which corresponds to that user as shown steps 70 and 72 in FIG. 3. For example, if UE 20 is able to make use of the file transfer service represented by one of the icons in group 60 based on the UE 20's terminal capabilities, then that icon could be emphasized in the user interface 50. Conversely, if the service capabilities of UE 20 do not support one of the services offered by the network/operator 26 associated with UE 22, then the icon representing that service may be de-emphasized or even removed (i.e., not displayed) in the user interface 50 as indicated by the "No" path from step 70 leading to step 74 in FIG. 3.

Figure 5:
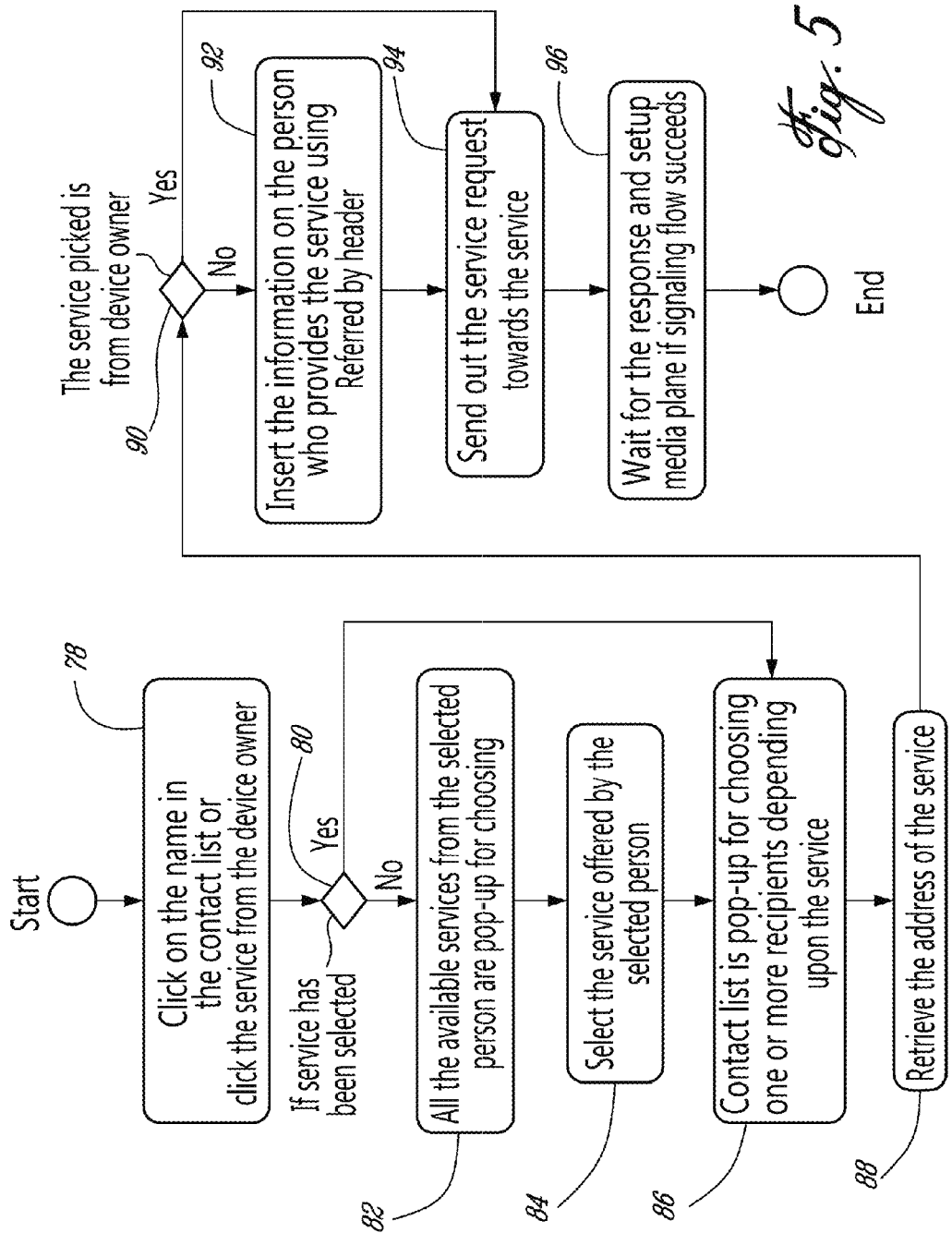
FIG. 5 is a flowchart illustrating a method for requesting an unsubscribed service according to exemplary embodiments.

Given this exemplary user interface 50, the user/UE 20 is now provided with information which enables him, her or it to request access to foreign services, i.e., those provided by other networks. The flowchart of FIG. 5 illustrates a method for requesting such a service according to an exemplary embodiment. Therein, at step 78, user A of UE 20 can, for example, click on (or otherwise select) one of the names in the contact list of user interface 50, e.g., to place a call to or send a text message to that other user, or click on (or otherwise select) one of the subscribed services in row 52. The client application associated with UE 20 checks to see if a service has been selected or not at decision block 80. If a local service, i.e., a service to which UE 20 is subscribed via its network/operator 24, has been selected, then the flow follows the "Yes" path skipping steps 82 and 84. If a local service has not been selected by the user A, then, according to this purely illustrative exemplary embodiment, the services offered by other users, e.g., user B may then be displayed for selection on UE 20 according to this exemplary embodiment at step 82. In this example, user A selects one of the services offered by user B at step 84.

The client application of UE 20 can then, for example, display (step 86) a contact list window which allows the user A to choose one or more recipients for the foreign service that it will access via the network/operator 26. After all of the recipients are selected, the client application of UE 20 can retrieve the service identification including the service address, such as a PSI (public service identity) at step 88. If a foreign service, e.g., a service offered by user B, is requested by UE 20, then the flow follows the "No" branch from decision block 90 and the identity of user B is inserted into the outgoing service request according to this exemplary embodiment at step 92. The identity of user B may then be used by the network/operator 26 to obtain authorization for the non-subscriber (user A, UE 20) to access the requested service. One exemplary mechanism for inserting user B's identity into the service request is to use a "Referred-by" header in a SIP request message. The identity of user B which is inserted into the service request can, for example, take the form of a SIP URI or an MSISDN, e.g. alice@operatorB.com or 514-3457900. However, it will be appreciated that this information or the like may be inserted into any other new or existing header that can be used to carry the identity of a subscribed user equipment.

If, on the other hand, the service selected at UE 20 is a local service, i.e., one offered by network/operator 24 in this example, then the flow follows the "Yes" path from block 90 and the extra user identity (i.e., associated with another user to access a foreign service) need not be inserted into the service request. At step 94, the service request is transmitted toward the service (e.g., server) using, e.g., the PSI in a Request-URI. The client application of UE 20 then waits for the response to the service request, e.g., following normal SIP signaling flow in this exemplary embodiment at step 96.

Figure 6:
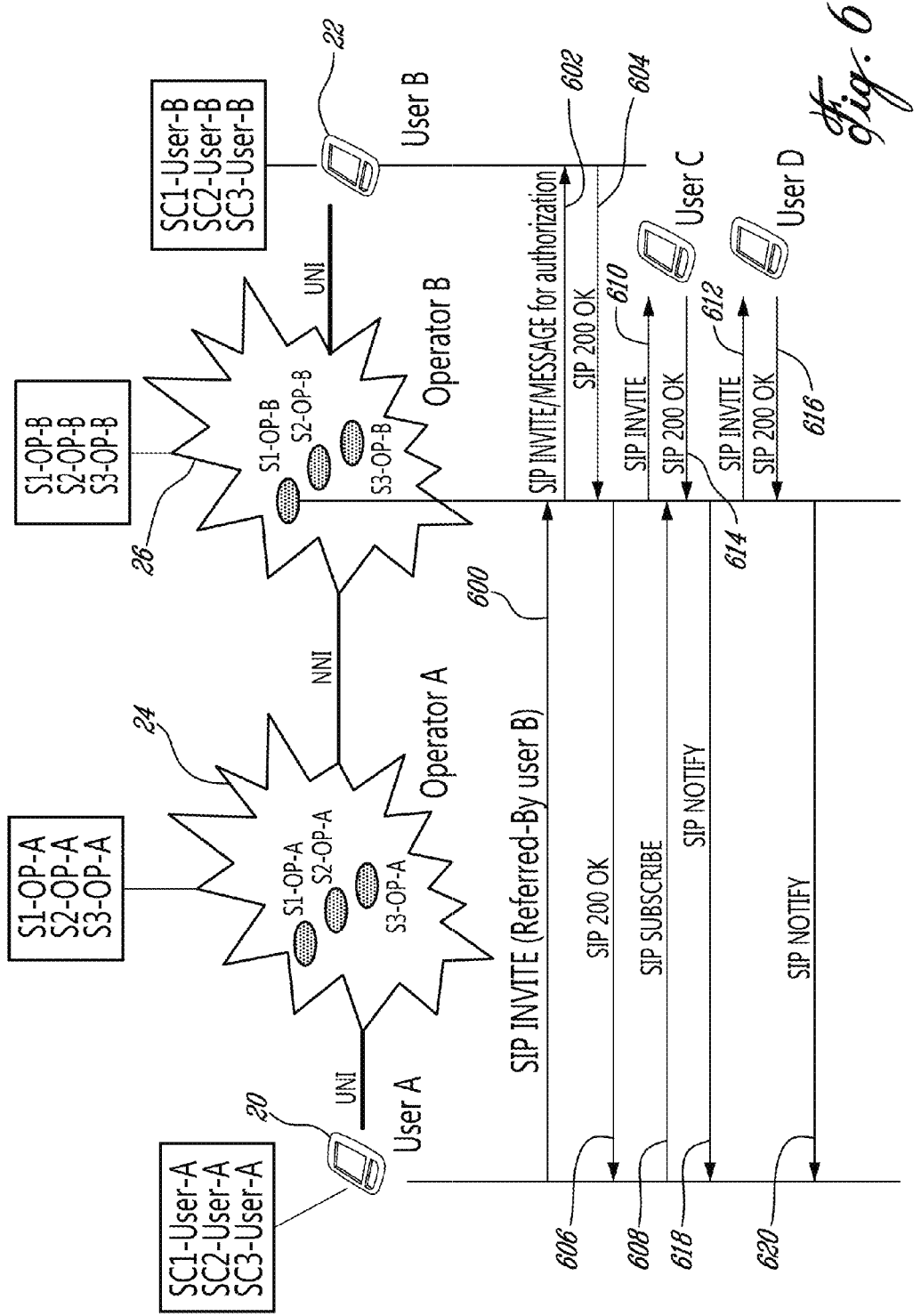
FIG. 6 is a signaling diagram associated with requesting and authorizing an unsubscribed service according to exemplary embodiments.

Once a service request has been transmitted by a UE 20 for a foreign service, i.e., a service from another network to which the UE 20 is not a subscriber, that service request will then be processed and, if authorized, the requested service delivered to the UE 20 and/or to the requested service recipients. FIG. 6 illustrates signaling associated with a foreign service request and subsequent processing according to an exemplary embodiment. Therein, a service request signal 600, e.g., a SIP INVITE message including an information element identifying UE 22 and an identifier of the requested service and/or associated server, is transmitted from the UE 20 toward operator/network 26. More specifically, according to this exemplary embodiment, a Request-URI information element in the SIP INVITE message 600 is set to the PSI of the service being requested, e.g. S1-OP-B@operatorB.com and the SIP URI associated with user B is placed into a "Referred-by" header.

After passing through the network 24, the service or server identified in the service request signal 600, e.g., S1-OP-B in this example, receives and processes the service request signal 600. Once it recognizes that the requesting party, i.e., UE 20, is not a subscriber, the service and/or server S1-OP-B transmits a request for authorization message 602, e.g., a SIP INVITE or SIP MESSAGE, asking user B and/or UE 22 to validate or authorize user A/UE 20's request to access this service. Various mechanisms may be used for determining whether to provide this authorization by user B and/or UE 22. For example, a user interface (not shown) on UE 22 could display a pop-up message asking user B to indicate, e.g., via a button press, whether user A and/or UE 20 should be permitted to access the requested service. Alternatively, UE 22 could be pre-programmed by user B to automatically authorize certain other users or UEs to access certain services. In such a case, UE 22 could check to see if the particular user/UE identified in message 602 is pre-authorized to access the requested service. Regardless of the particular mechanism for providing the authorization, a signal 604 is returned from UE 22 to server S1-OP-B, in this example a SIP 2000K message indicating that the request has been authorized.

After obtaining the authorization from user B and/or UE 22, the service server S1-OP-B sends the successful response 606 to user A/UE 20 to indicate that user B has authorized him, her or it to use the requested service. In this example, suppose that user A has indicated a desire to involve other users, e.g., users C and D, as recipients of the requested service. User A/UE 20 then sends, for example, a SIP SUBSCRIBE request 608 towards the service to obtain the status of the service. The service/server S1-OP-B in operator B's network 26 sends invitations 610, 612 to, for example, user C and user D based on the recipient-list in the initial SIP INVITE request 600 sent by user A. It will be appreciated that users C and/or D may, or may not, be subscribers of operator B or operator A. When the responses 614, 616 from user C or user D are received, respectively, the service sends notifications 618, 620 to user A/UE 20 as an update regarding the status of the service. After the exemplary signaling flow shown in FIG. 6 is successful, the media plane connections among user A, user C and user D is established. Media content may then be exchanged among all the service participants (not shown in FIG. 6).

The foregoing exemplary embodiments enable, among other things, for end users, e.g., of IMS systems, to more freely share services. IMS users are not limited to only their operator's services, but will also have controlled access to services available from other operators. For an operator who has deployed new multimedia services, these exemplary embodiments provide a mechanism for drawing extra traffics to its network. Additionally, such operators will have an opportunity to test such new applications with a larger population of end users. For the operator who has not yet deployed such new multimedia services, these exemplary embodiments provide a way for it to be able to test the market reaction for services deployed by other operators. When potential growth is identified, the operator is then able to deploy similar services, e.g., with updates tailored to its own subscriber base.

Figure 7:
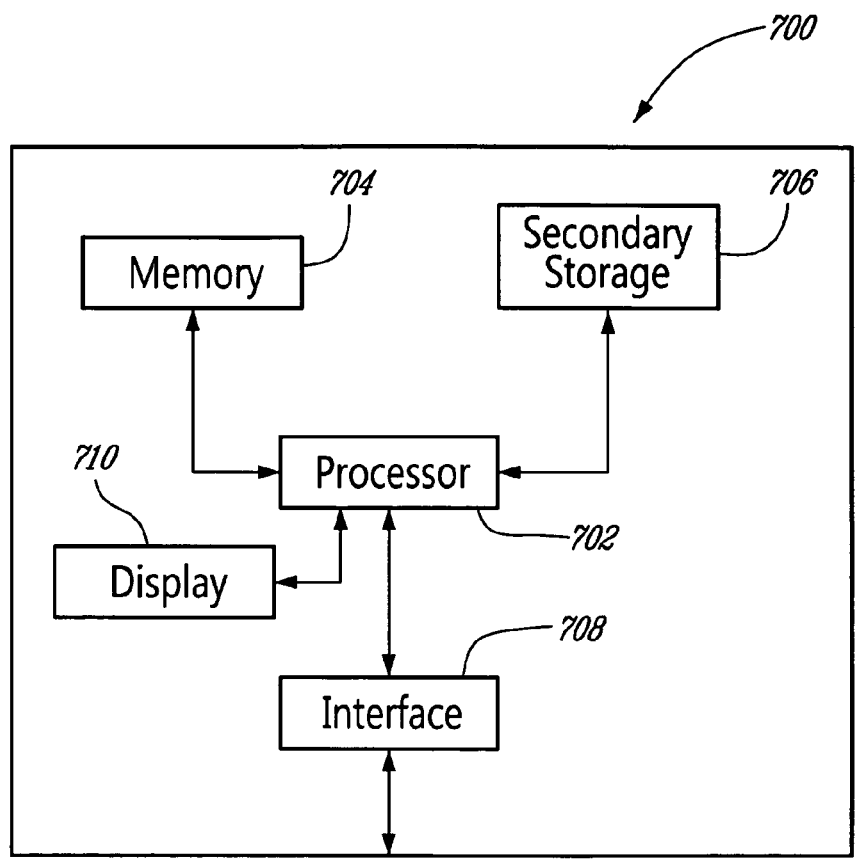
FIG. 7 shows a communication node according to exemplary embodiments.

The exemplary embodiments described above provide for, among other things, identification of, requests for, authorization of, and delivery of services to non-subscribers. An exemplary communications node architecture 700 which can be used, for example, to implement UE 20, service server S1-OP-B, or other nodes in the systems described above will now be described with respect to FIG. 7. Therein, node 700 can contain a processor 702 (or multiple processor cores), memory 704, one or more secondary storage devices 706, a an interface unit 708 to facilitate communications between node 700 and the rest of the network and, in some cases, a display 710. In some cases, e.g., where node 700 is operating as a wireless UE, interface unit 710 may include transceiver elements for communicating over an air interface with other network nodes. Further, a UE node 700 may include a display 710 for displaying a user interface by way of which an unsubscribed service may be selected, in which case the processor 702 will be configured to transmit a service request for the selected, unsubscribed service, e.g., toward a server which provides the selected, unsubscribed service. In other cases, e.g., where node 700 is operating as a server associated with a foreign service which has been requested, the interface unit 710 will receive a service request for a service, the memory device 704, and/or secondary storage devices 706, operates to store information associated with the service request from signal 600 while the processor extracts an identity of a subscribed user equipment from the service request and sends subsequent authorization signaling toward that UE.

Figure 8:
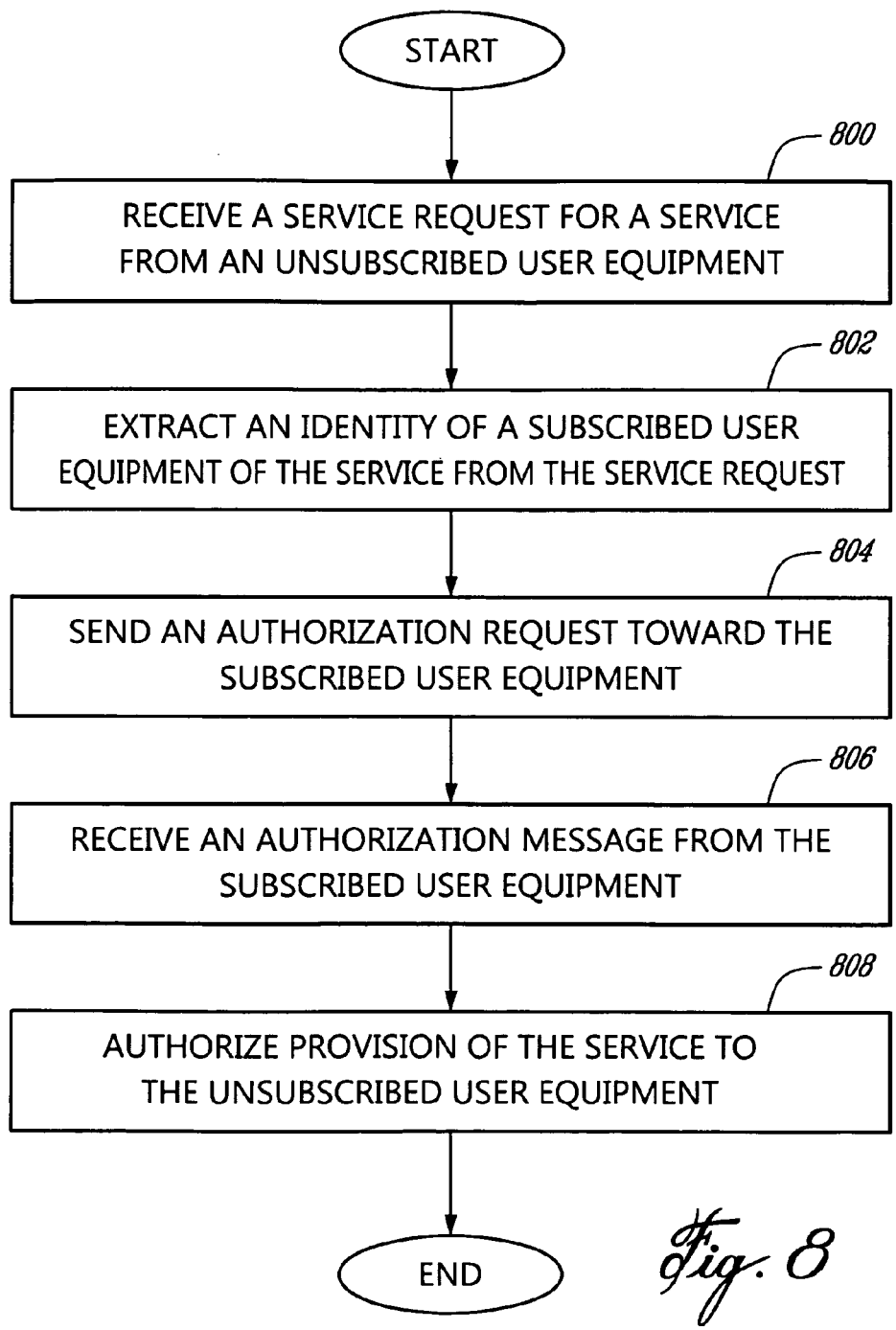
FIG. 8 is a flowchart depicting a method for providing a service to an unsubscribed user according to an exemplary embodiment.

Utilizing the above-described exemplary systems according to exemplary embodiments, a method for providing a service to an unsubscribed user is shown in the flowchart of FIG. 8. Therein, at step 800, a service request for a service from an unsubscribed user equipment is received, e.g., at a server which provides that service. An identity of a subscribed user equipment of that service is extracted from the service request at step 802. Then, an authorization request is sent toward the subscribed user equipment at step 804. An authorization message is received from the subscribed user equipment (step 806), and the service may then be authorized for provision to (or provided to) the unsubscribed user equipment at step 808.

Figure 9:
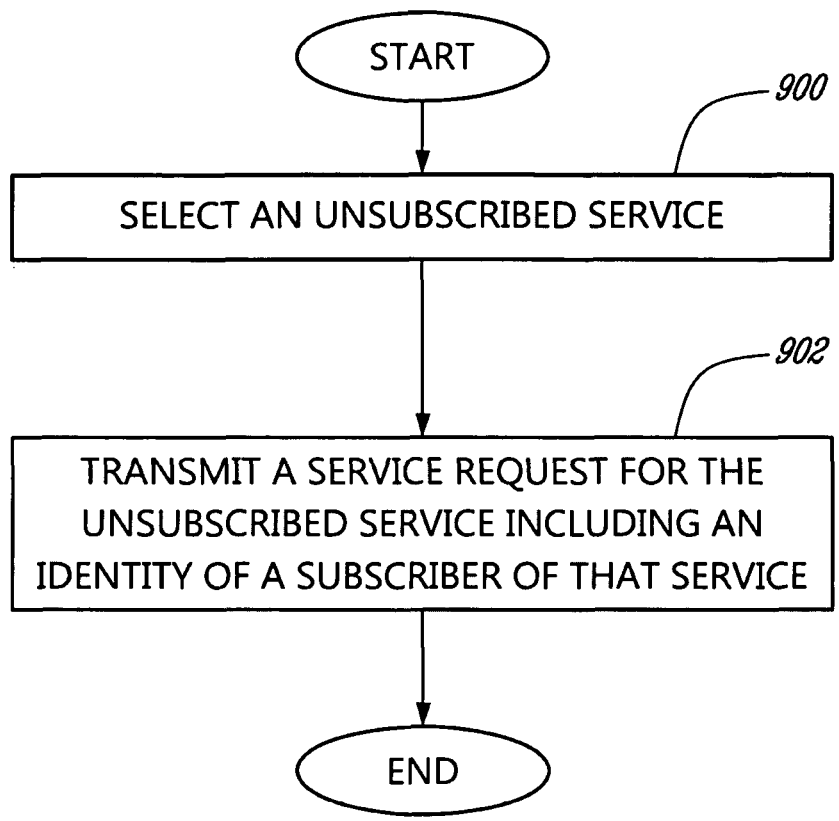
FIG. 9 is a flowchart depicting a method for accessing an unsubscribed service according to exemplary embodiments.

According to another exemplary embodiment, a method for accessing an unsubscribed service from a user equipment is shown in the flowchart of FIG. 9. Therein, at step 900, an unsubscribed service is selected, e.g., as discussed above with respect to FIGS. 3 and 4. A service request for that unsubscribed service is transmitted at step 902 toward a server which provides that unsubscribed service, the service request including an identity of a subscriber of the unsubscribed service.

As will be appreciated by those skilled in the art, methods such as that illustrated in FIGS. 8 and 9 can be implemented completely or partially in software. Thus, systems and methods for processing data according to exemplary embodiments of the present invention can be performed by one or more processors executing sequences of instructions contained in a memory device. Such instructions may be read into the memory device 704 from other computer-readable mediums such as secondary data storage device(s) 706, which may be fixed, removable or remote (network storage) media. Execution of the sequences of instructions contained in the memory device causes the processor to operate, for example, as described above. In alternative embodiments, hard-wire circuitry may be used in place of or in combination with software instructions to implement exemplary embodiments.

Although the foregoing exemplary embodiments have been described in the context of the provision of foreign services, e.g., the provision of an unsubscribed service from one network or operator domain to a user who is connected to another network or operator domain, it will be appreciated that the present invention is not so limited. For example, a first user may access a service to which he or she has not yet subscribed upon authorization from a second user where both users are located in the same network or operator domain. Thus all of the techniques which are described above with respect to accessing unsubscribed, foreign services, e.g., their display via a user interface, their selection by an unsubscribed user and the associated signaling, may be applied in the same way to unsubscribed services which are available in a user's own network or operator domain.

The above-described exemplary embodiments are intended to be illustrative in all respects, rather than restrictive, of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method for providing a service to a first unsubscribed user comprising:

receiving in a server a service request for a service from a first unsubscribed user equipment having not subscribed to the service and that belongs to the first, unsubscribed user, the service request comprising an identity of the service and an identity of a second, subscribed user equipment of said service, the second subscribed user equipment having subscribed to said service, and belonging to a second, subscribed user;

extracting, by the server, from said service request, the identity of the second, subscribed user equipment of said service;

sending, from the server, an authorization request toward said second, subscribed user equipment for authorizing access to said service for said first unsubscribed user equipment;

receiving, at the server, an authorization message from said second, subscribed user equipment authorizing access to said service for said first, unsubscribed user equipment; and authorizing provision of said service to said first, unsubscribed user equipment;
wherein said first, unsubscribed user is different than said second, subscribed user.

2. The method of claim 1, wherein said first, unsubscribed user equipment is a subscriber of a first network and said second, subscribed user equipment is a subscriber of a second network different from said first network.

3. The method of claim 1, wherein said service request is a SIP INVITE message including a Request-URI information element includes a public service identity (PSI) associated with said service.

4. The method of claim 1, wherein said identity of said second, subscribed user equipment is extracted from a Referred-by header in a SIP INVITE message.

5. The method of claim 1, wherein said service is Internet Protocol Television (IPTV) and said service is provided via an IP Multimedia Subsystem (IMS).

6. A communications node comprising:
an interface for receiving a service request for a service from a first, unsubscribed user equipment, that belongs to a first, unsubscribed user wherein the first, unsubscribed user equipment has not subscribed to the service, the service request comprising an identity of said service and an identity of a second, subscribed user equipment having subscribed to said service and belonging to a second, subscribed user;
a memory device for storing information associated with said service request; and
a processor configured to extract, from said service request, the identity of the second subscribed user equipment, and to send an authorization request toward said second subscribed user equipment for authorizing access to said service for said first unsubscribed user equipment,
said interface receiving an authorization message from said second subscribed user equipment authorizing access to said service for said first unsubscribed user equipment, and said processor authorizing provision of said service to said first unsubscribed user equipment
wherein said first, unsubscribed user is different than said second, subscribed user.

7. The communications node of claim 6, wherein said first unsubscribed user equipment is a subscriber of a first network and said second subscribed user equipment is a subscriber of a second network different from said first network.

8. The communications node of claim 6, wherein said service request is a SIP INVITE message including a Request-URI information element includes a public service identity (PSI) associated with said service.

9. The communications node of claim 6, wherein said identity of the second subscribed user equipment is extracted from a Referred-by header in a SIP INVITE message.

10. The communications node of claim 6, wherein said service is Internet Protocol Television (IPTV) and said service is provided via an IP Multimedia Subsystem (IMS).

11. A method for accessing an unsubscribed service from a first, unsubscribed user equipment, comprising:
displaying on a Graphical User Interface (GUI) of said first, unsubscribed user equipment an unsubscribed service, said first, unsubscribed user equipment having not subscribed to the service, and belonging to a first unsubscribed user, wherein said unsubscribed service is subscribed to by a second, subscribed user equipment that subscribed to said service, and that belongs to a second, subscribed user;
receiving a selection of the unsubscribed service using the GUI of the first, unsubscribed user equipment; and
transmitting a service request from said first, unsubscribed user equipment for said unsubscribed service toward a server, the service request comprising an identity of the unsubscribed service and an identity of the second, subscribed user equipment that subscribed to said service, and that belongs to a second, subscribed user;
receiving an indication that access to said unsubscribed service has been authorized for said first, unsubscribed user equipment; and
accessing the unsubscribed service by said first, unsubscribed user equipment
wherein said first, unsubscribed user is different than said second, subscribed user.

12. The method of claim 11, wherein said service request comprises a SIP INVITE message including a Request-URI information element includes a public service identity (PSI) associated with said service.

13. The method of claim 11, wherein said identity of said second subscribed user equipment is disposed in a Referred-by header in a SIP INVITE message.

14. The method of claim 11, wherein said unsubscribed service is the Internet Protocol Television (IPTV) and is provided via an IP Multimedia Subsystem (IMS).

15. The method of claim 11, wherein:
said step displaying further comprises displaying, on the GUI, a plurality of users, their terminal capabilities and their associated services; and
said step of receiving the selection comprises receiving a selection, as said unsubscribed service for said user equipment, of one of said associated services for which said user equipment has a corresponding terminal capability.

16. The method of claim 15, further comprising:
displaying with emphasis, on said GUI, the services for which said first user equipment has a corresponding terminal capability.

17. The method of claim 11, further comprising the step of:
subscribing by the first unsubscribed user equipment to presence information related to the second subscribed user equipment;
responsive to the step of subscribing, receiving at said first unsubscribed user equipment presence information associated with the second subscribed user equipment, the presence information comprising the identity of the second subscribed user equipment and the identity of services the second subscribed user equipment has subscribed to.

18. A first, unsubscribed user equipment comprising:
a Graphical User Interface (GUI) displaying an unsubscribed service of said first, unsubscribed user equipment that belongs to a first, unsubscribed user, said unsubscribed service being subscribed to by a second, subscribed user equipment that belongs to a second, subscribed user, the GUI being adapted to receive a selection of the unsubscribed service;
a processor configured to transmit a service request for said unsubscribed service toward a server, the service request comprising an identity of the unsubscribed service and an identity of the second, subscribed user equipment that is subscribed to said service, the processor being further configured to receive an indication that access to said unsubscribed service has been authorized for said first, unsubscribed user equipment;

wherein the first, unsubscribed user equipment accesses the unsubscribed service and said first, unsubscribed user is different than said second, subscribed user.

19. The user equipment of claim 18, wherein said service request comprises a SIP INVITE message including a Request-URI information element includes a public service identity (PSI) associated with said service.

20. The user equipment of claim 18, wherein said identity of said second subscribed user equipment is disposed in a Referred-by header in a SIP INVITE message.

21. The user equipment of claim 18, wherein said unsubscribed service is the Internet Protocol Television (IPTV) and is provided via an IP Multimedia Subsystem (IMS).

22. The user equipment of claim 18, wherein said GUI is further configured to display a plurality of users, their terminal capabilities and their associated services; and to receive a selection, as said unsubscribed service, of one of said associated services for which said first, unsubscribed user equipment has a corresponding terminal capability.

23. The user equipment of claim 22, wherein said GUI is further configured to display with emphasis those associated services for which said first unsubscribed user equipment has a corresponding terminal capability.

24. The user equipment of claim 18, wherein the processor is further configured to subscribe to presence information related to the second subscribed user equipment, and responsive thereto to receive presence information associated with the second subscribed user equipment, the presence information comprising the identity of the subscribed user and the identity of the service the second subscribed user has subscribed to.

* * * * *